United States Patent
Saurat et al.

(10) Patent No.: US 11,125,135 B2
(45) Date of Patent: Sep. 21, 2021

(54) MODULAR SYSTEM FOR EXHAUST HEAT RECOVERY DEVICES, TUBULAR ADAPTER FOR A MODULAR SYSTEM, AND VEHICLE

(71) Applicant: Faurecia Emissions Control Technologies, Germany GmbH, Augsburg (DE)

(72) Inventors: David Saurat, Augsburg (DE); Anton Berchtold, Augsburg (DE)

(73) Assignee: Faurecia Emissions Control Technologies, Germany GmbH

( * ) Notice: Subject to any disclaimer, the term of this patent is extended or adjusted under 35 U.S.C. 154(b) by 0 days.

(21) Appl. No.: 16/829,256

(22) Filed: Mar. 25, 2020

(65) Prior Publication Data
US 2020/0309010 A1 Oct. 1, 2020

(30) Foreign Application Priority Data
Mar. 26, 2019 (DE) .................... 10 2019 107 792.3

(51) Int. Cl.
*F01N 3/02* (2006.01)
*F01N 5/02* (2006.01)
(Continued)

(52) U.S. Cl.
CPC ............. *F01N 5/02* (2013.01); *F01N 3/0205* (2013.01); *F01N 13/18* (2013.01); *F02G 5/02* (2013.01);
(Continued)

(58) Field of Classification Search
CPC .......... F01N 3/0205; F01N 5/02; F01N 13/18; F01N 2410/00; F01N 2470/10; F02G 5/02; F28D 21/0003; F28F 2280/06
See application file for complete search history.

(56) References Cited

U.S. PATENT DOCUMENTS 6,141,961 A 11/2000 Rinckel
2004/0251012 A1* 12/2004 Bush ...................... B60H 1/18
165/81
(Continued)

FOREIGN PATENT DOCUMENTS

DE 10303910 A1 8/2004
DE 102015206895 A1 10/2016
(Continued)

OTHER PUBLICATIONS

Prof. Dr. Kai-Ingo Voigt, Translation of Baukastensystem "Modular System" https://wirtschaftslexikon.gabler.de/definition/baukastensystem-29817/version-253415.
(Continued)

*Primary Examiner* — Audrey B. Walter
(74) *Attorney, Agent, or Firm* — Carlson, Gaskey & Olds, P.C.

(57) ABSTRACT

A modular system for exhaust heat recovery devices has heat exchangers which differ by different external dimensions, in particular different cross-sections, and identically configured exhaust gas carrying housings into each of which one of the heat exchangers can be introduced. Various tubular adapters are adapted to the external dimensions of the heat exchangers and are used to fasten the associated heat exchanger at its connection ends to the exhaust gas carrying housing. Furthermore, a tubular adapter for a corresponding modular system and a vehicle which has a corresponding exhaust heat recovery device are provided.

12 Claims, 2 Drawing Sheets

(51) Int. Cl.
*F01N 13/18* (2010.01)
*F02G 5/02* (2006.01)
*F28D 21/00* (2006.01)

(52) U.S. Cl.
CPC ...... *F28D 21/0003* (2013.01); *F01N 2240/02* (2013.01); *F01N 2410/00* (2013.01); *F01N 2470/10* (2013.01); *F28F 2280/06* (2013.01)

(56) References Cited

U.S. PATENT DOCUMENTS

| | | | | |
|---|---|---|---|---|
| 2011/0284186 | A1* | 11/2011 | Hirai | F28F 9/0282 165/104.19 |
| 2017/0152816 | A1 | 6/2017 | Ohrem et al. | |
| 2018/0245858 | A1* | 8/2018 | Dornseif | F28F 27/00 |

FOREIGN PATENT DOCUMENTS

| | | | | |
|---|---|---|---|---|
| DE | 102016122455 | A1 | 6/2017 | |
| EP | 0930429 | A2 * | 7/1999 | F28D 7/1684 |
| EP | 0942156 | A1 | 9/1999 | |
| EP | 2425195 | B1 | 10/2018 | |

OTHER PUBLICATIONS

G. Pahl, W. Beitz: "Konstruktionslehre: Methoden und Anwendung", Berlin, DE, 1997, pp. 575-628, ISBN 978-3-662-08162-4.
G. Pahl, W. Beitz: "Konstruktionslehre: Methoden und Anwendung", Berlin, DE, 1997, pp. 575-628, ISBN 978-3-662-08162-4. Including a summary of relevance in English.

* cited by examiner

MODULAR SYSTEM FOR EXHAUST HEAT RECOVERY DEVICES, TUBULAR ADAPTER FOR A MODULAR SYSTEM, AND VEHICLE

CROSS-REFERENCE TO RELATED APPLICATIONS

This application is a U.S. non-provisional application claiming the benefit of German Application No. 10 2019 107 792.3, filed on Mar. 26, 2019, which is incorporated herein by its entirety.

FIELD OF INVENTION

The invention relates to a modular system for the manufacture of exhaust heat recovery devices for an internal combustion engine and to a tubular adapter for a modular system and a vehicle with an exhaust heat recovery device.

BACKGROUND

A vehicle exhaust system conducts the hot exhaust gas generated by an internal combustion engine through various devices, for example through devices for emission control and/or for noise reduction. The hot exhaust gases contain approximately one third of the energy contained in the fuel, so that typically an exhaust heat recovery device is used in the vehicle exhaust system in order to utilize at least part of the energy of the hot exhaust gas, for example by transferring it to another device or a liquid.

Since different vehicles, or rather vehicles that have different engine power, normally always employ vehicle exhaust systems of identical construction and exhaust heat recovery devices of identical construction, the vehicle exhaust system must be designed for the most powerful engine variant. This results in the exhaust heat recovery device being overdesigned for less powerful engines, that is, the exhaust heat recovery device can extract more energy from the hot exhaust gas than necessary. As a result, typically too much material is used in the exhaust heat recovery device, involving high costs for materials and processing.

The subject disclosure provides exhaust heat recovery devices that are resource-conserving and easy to adapt to the exhaust heat output of the vehicle exhaust system.

SUMMARY

A modular system for exhaust heat recovery devices includes heat exchangers which differ by different external dimensions, and wherein the heat exchangers have connection ends. The system also includes identically configured exhaust gas carrying housings into each of which one of the heat exchangers can be introduced, each exhaust gas carrying housing having an upstream connection opening and a downstream connection opening and the associated heat exchanger being fluidically seated between the upstream and downstream connection openings. Various tubular adapters are adapted to the external dimensions of the heat exchangers and are used to fasten the associated heat exchanger at the connection ends to the exhaust gas carrying housing, the tubular adapters surrounding the connection openings.

In one example, the different external dimensions comprise different cross-sections.

The subject disclosure is based on the fundamental idea that the exhaust heat recovery devices are manufactured in a modular system, with the housing that can be inserted into a vehicle exhaust system always being identical. Two connection openings are provided on the housing, between which the heat exchanger can be inserted via tubular adapters, so that the heat exchanger defines the flow path between the connection openings. By adapting the adapters appropriately, heat exchangers of different cross-sections can be fastened to the connection openings. Accordingly, the modular system according to the disclosure is easily adaptable, and a suitable heat exchanger and suitable adapters can be used for the appropriate engine variant. Furthermore, the modular system is resource-conserving and cost-effective.

In one exemplary embodiment, the heat exchangers have a respective shoulder at each of their opposite connection ends. The shoulders of the heat exchangers constitute the receiving area for the adapters and are stepped with respect to the rest of the respective heat exchanger by a jump in cross-section. This allows the adapters to be fastened to the heat exchangers in a simple manner.

The receiving areas of the heat exchanger may have a smaller cross-section than the rest of the heat exchanger.

To allow tolerances in the axial direction and at the same time conduct the entire heat flow to the heat exchanger, the adapters can receive the respective heat exchanger at a distance from the associated connection opening and bridge the distance between the heat exchanger and the connection opening.

In order to allow the adapters to be easily fitted to the connection openings, the adapters may each be in the form of a tube with a bent flange, the respective flange surrounding the associated connection opening. This also ensures that the exhaust gas cannot escape unintentionally between the heat exchanger and the connection opening.

The adapters are fastened to the housing by soldering or welding, for example.

Positioning of the heat exchangers between the connection openings can be carried out by using an indentation on the adapters, which protrudes inwards. The indentation of each adapter forms an axial stop for the associated heat exchanger.

In one exemplary embodiment, the adapters are non-releasably connected with the respective heat exchangers. The adapters thus fix the respective heat exchanger in place between the connection openings.

The non-releasable connection between the adapters and the respective heat exchangers may be effected by soldering or welding, for example.

To improve the durability of the heat exchangers and to prevent foreign bodies from inadvertently entering, each heat exchanger may be surrounded by a protective housing which protects the respective heat exchanger from outside influences.

For example, the protective housing is fastened to the adapters or to the exhaust gas carrying housing. This means that no additional parts are required for fastening the housing.

Identical protective housings may be provided for all exhaust heat recovery devices. This allows economies of scale to be utilized and cost-effective exhaust heat recovery devices to be provided.

Using connection openings and heat exchangers having a rectangular cross-section will result in a compact and thus space-saving design.

The cross-section of the heat exchangers may be adapted to the maximum exhaust heat output of the vehicle.

A tubular adapter for a modular system is also provided. The tubular adapter has a laterally projecting, encircling flange and a through opening through which the exhaust gas can flow. With regard to the advantages and features of the adapter, reference is made to the preceding discussions of the modular system for the manufacture of exhaust heat recovery devices.

Also provided is a vehicle having an internal combustion engine, an exhaust pipe that branches into first and second flow paths, an exhaust heat recovery device that is manufactured via the modular system and is positioned in the second flow path, and a valve that controls an exhaust gas flow between the first and second flow paths. With regard to the advantages and features of the vehicle, reference is made to the above discussions of the modular system for the manufacture of exhaust heat recovery devices.

DETAILED DESCRIPTION

Figure 1:
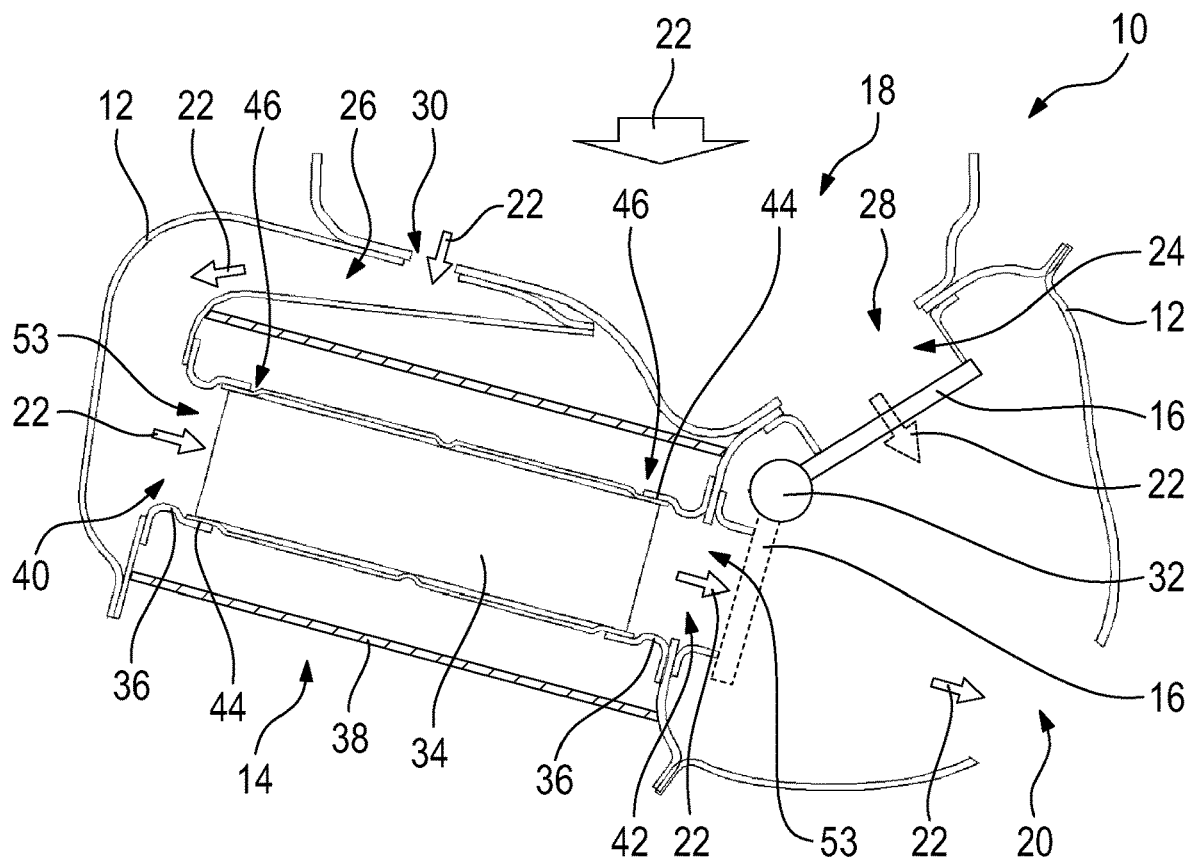
FIG. 1 shows a longitudinal section through part of a vehicle, according to one example, with an exhaust heat recovery device that is manufactured using a modular system according to one exemplary embodiment.

FIG. 1 shows a longitudinal section through part of a vehicle exhaust system 10 for an internal combustion engine. The vehicle exhaust system 10 includes a housing 12, an exhaust heat recovery device 14, and a valve 16.

The housing 12 has an inlet opening 18 and an outlet opening 20 and forms an exhaust pipe within the housing 12, so that exhaust gas 22, illustrated by arrows, coming from the internal combustion engine and flowing through the inlet opening 18 into the vehicle exhaust system 10, is directed to the outlet opening 20.

The housing 12 is shaped to have two flow paths 24, 26 within the housing 12 for the exhaust gas 22. Flow path openings 28, 30 are provided, through which the exhaust gas 22 can enter the flow paths 24, 26.

The first flow path opening 28 fluidically connects the inlet opening 18 with the first flow path 24, which connects the inlet opening 18 directly, i.e. without the exhaust gas 22 flowing through further components of the vehicle exhaust system 10, with the outlet opening 20. The first flow path 24 thus is a bypass.

The second flow path opening 30 fluidically connects the inlet opening 18 with the second flow path 26, which conducts the exhaust gas 22 through the exhaust heat recovery device 14.

The valve 16 is mounted to swivel about a swivel axis 32 and is adapted to be swiveled between a first position and a second position. FIG. 1 illustrates the valve 16 in the first position, and the second position is indicated by dashed lines.

In the first position, the valve 16 closes the first flow path opening 28, so that in this position of the valve 16 all of the exhaust gas 22 is directed through the second flow path 26. Accordingly, in FIG. 1, the entire exhaust gas 22 flowing into the housing 12 through the inlet opening 18 is conducted through the exhaust heat recovery device 14 in the second flow path 26. The flow path of the exhaust gas 22 through the first flow path 24 is therefore only indicated by dashed lines.

In the second position, the valve 16 closes the second flow path opening 30, so that in this position of the valve 16, all of the exhaust gas 22 is directed through the first flow path 24.

In particular, the valve 16 can assume continuously variable intermediate positions, so that in the intermediate position the exhaust gas 22 can flow through the first flow path 24 and through the second flow path 26. By appropriately positioning the valve 16 between the first and second positions, the branching ratio of the exhaust gas 22, i.e. the proportion of the exhaust gas 22 flowing through the first flow path 24 and the proportion of the exhaust gas 22 flowing through the second flow path 26, can be adjusted accordingly.

In other words, the valve 16 controls the exhaust gas 22 between the first flow path 24 and the second flow path 26.

The exhaust heat recovery device 14 comprises the housing 12 of the second flow path 26, a heat exchanger 34, two tubular adapters 36, and a protective housing 38.

The housing 12 of the second flow path 26 has an upstream connection opening 40, which is fluidically connected with the inlet opening 18 of the vehicle exhaust system 10, and a downstream connection opening 42, which is fluidically connected with the outlet opening 20 of the vehicle exhaust system 10.

Figure 2:
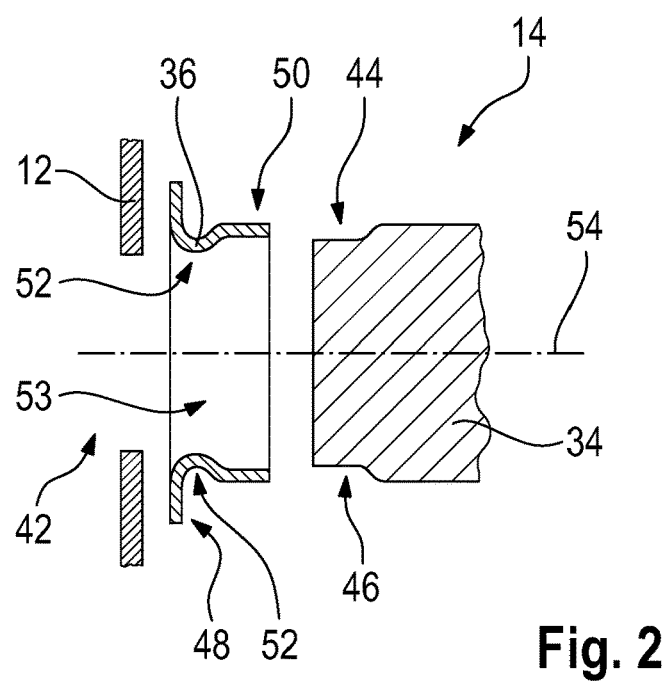
FIG. 2 shows an exploded illustration of an adapter and a heat exchanger of the exhaust heat recovery device from FIG. 1 in a longitudinal section.

FIG. 2 shows a longitudinal section through the exhaust heat recovery device 14 in the area of the downstream connection opening 42 in a schematic exploded view. The features of the exhaust heat recovery device 14 in the area of the downstream connection opening 42 described below are correspondingly also provided at the upstream connection opening 40.

At its connection end 44, shown in FIG. 2, the heat exchanger 34 has a shoulder 46 which has a smaller cross-sectional area than the rest of the heat exchanger 34. The shoulder 46 is therefore separated from the rest of the heat exchanger 34 by a jump in cross-section.

Figure 4:
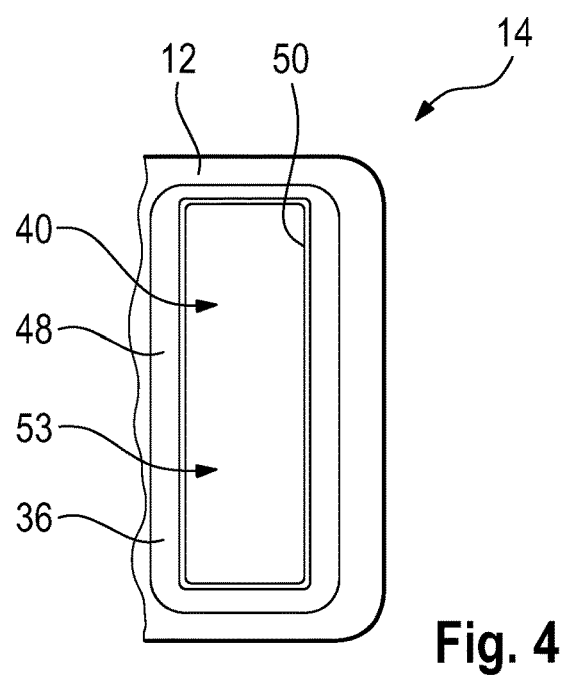
FIG. 4 shows a top view of the connection opening of the housing of the modular system from FIG. 3, to which the adapter is attached.

In FIGS. 1 and 4 the heat exchanger 34 has a cuboid design so that the cross-sectional area is substantially rectangular. In the area of the shoulder 46, the heat exchanger 34 thus has smaller dimensions than the rest of the heat exchanger 34.

The adapter 36 is tubular, formed similar to a rectangular frame, and has a bent flange 48 at one axial end and a widened receiving area 50 at the other axial end. An indentation 52 protruding inwards is provided between the bent flange 48 and the receiving area 50.

Furthermore, the adapter 36 has a through opening 53, which fluidically connects the bent flange 48 and the widened receiving area 50.

In other words, the tubular adapter 36 has the smallest cross-sectional area in a middle section and the largest cross-sectional area in the region of an end or of both ends, i.e. in the region of the receiving area 50 and/or in the region of the bent flange 48.

The receiving area 50 of the adapter 36 is adapted to the external dimensions of the heat exchanger 34, so that the receiving area 50 closely surrounds the connection end 44 of the heat exchanger 34, preferably by use of a transition fit or a light press fit.

More precisely, the receiving area 50 is integrally molded with the shoulder 46 of the heat exchanger 34 and the receiving area 50 peripherally encloses the heat exchanger 34 in the region of the shoulder 46.

In the region of the receiving area 50 and the shoulder 46, the adapter 36 and the heat exchanger 34 are non-releasably connected with each other, for example by soldering or welding.

Here, the indentation 52 protruding inwards constitutes an axial stop for the connection end 44 of the heat exchanger 34.

The cross-sectional area of the flange 48 is configured such that the flange 48 surrounds the connection openings 40, 42 over the entire circumference. The bent flange 48 of the adapter 36 is non-detachably fastened to the housing 12 of the exhaust heat recovery device 14, for example by soldering or welding.

In this way, the heat exchanger 34 is fastened at its respective connection ends 44 to the housing 12 by the two adapters 36.

As can be seen in FIG. 1, the adapters 36 receive the heat exchanger 34 at a distance from the associated connection opening 40 and 42, respectively. The adapters 36 thus bridge this distance between the heat exchanger 34 and the connection openings 40 and 42, respectively.

The protective housing 38 is fastened at its ends to the housing 12 of the exhaust heat recovery device 14 so as to be non-detachable and circumferentially encloses both the adapters 36 and the heat exchanger 34.

The protective housing 38 is adapted to protect in particular the heat exchanger 34 from outside influences, for example from moisture and dirt.

Therefore, the protective housing 38 is made from a material that does not allow moisture or dirt to pass through, such as a membrane, plastics or a sheet metal, for example.

More particularly, the protective housing 38 is made from the same material as the housing 12.

The heat exchanger 34 is fluidically arranged between the upstream connection opening 40 and the downstream connection opening 42, so that the exhaust gas 22 can flow from the upstream connection opening 40 through the heat exchanger 34 and to the downstream connection opening 42.

More precisely, the exhaust gas 22 flows from the upstream connection opening 40 through the opening 53 of the upstream adapter 36 and into the upstream side of the heat exchanger 34 and from the downstream side of the heat exchanger 34 through the opening 53 of the downstream adapter 36 and into the downstream connection opening 42.

Accordingly, the exhaust gas 22 flows through the opening 53 of the adapter 36.

The heat exchanger 34 extracts thermal energy from the hot exhaust gas 22 and transfers this thermal energy to a further medium (not shown), for example a liquid.

FIG. 1 shows only part of the vehicle exhaust system 10. Generally, the vehicle exhaust system 10 conducts the hot exhaust gas 22 generated by an internal combustion engine through various components in order to reduce exhaust emissions and noise, among other things. The various components may include one or more of the following: pipes, filters, valves, catalytic converters, exhaust mufflers, exhaust heat recovery devices (see FIG. 1), etc. After passing through the various components, the exhaust gas 22 exits the vehicle exhaust system 10 into the atmosphere as known.

Figure 3:
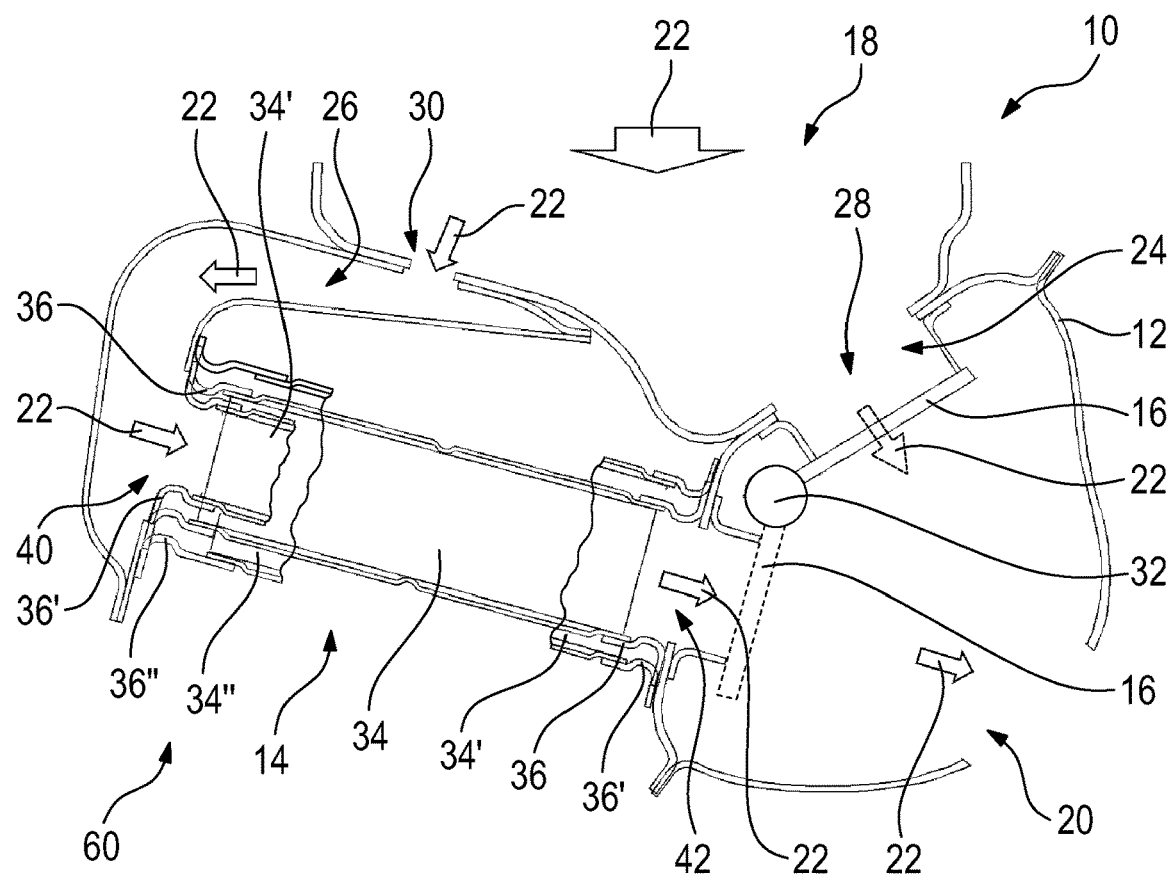
FIG. 3 shows a longitudinal section through a modular system according to one example for the manufacture of exhaust heat recovery devices.

The exhaust heat recovery device 14 of FIGS. 1 and 2 is manufactured using a modular system 60 that is shown in FIG. 3. FIG. 3 shows a longitudinal section through the modular system 60.

The individual sections of the heat exchangers 34, 34', 34", for example the connection ends 44, the shoulders 46, the sections of the adapters 36, 36', 36", for example the indentation 52, the bent flange 48 and the receiving area 50 are explicitly not provided with a reference number. The heat exchangers 34, 34', 34" and the adapters 36, 36', 36" substantially correspond to the embodiment shown in FIGS. 1 and 2. Therefore, only the differences will be discussed below.

The modular system 60 is adapted to fasten heat exchangers 34, 34', 34" having different external dimensions to the identically configured housing 12 by using suitable adapters 36, 36', 36".

FIG. 3 illustrates the attachment of heat exchangers 34' having different cross-sectional sizes. A heat exchanger 34' having a larger cross-sectional size is indicated at the connection opening 42 and a heat exchanger 34' having a smaller cross-sectional size is indicated at the connection opening 40.

In the modular system 60 of FIG. 3, the maximum length of the heat exchangers 34, 34', 34" is limited by the distance between the upstream connection opening 40 and the downstream connection opening 42.

Heat exchangers 34" of different lengths may be used in the modular system 60, i.e. shorter heat exchangers 34" than the heat exchangers 34, 34'. This is illustrated at the upstream connection opening 40, where a heat exchanger 34" having a shorter length than the heat exchanger 34 is arranged. To receive the heat exchanger 34" between the connection openings 40, 42, the associated adapter 36" is longer than the adapter 36.

More precisely, the receiving area 50 of the adapter 36" is longer and the heat exchanger 34" is received with a greater distance from the respective connection opening 40, 42.

For reasons of clarity, the protective housing 38 is not illustrated in FIG. 3. It is conceivable that the identical protective housing 38 is used for all exhaust heat recovery devices 14 of the modular system 60.

In addition, the protective housing 38 may alternatively or additionally also be fastened to the heat exchanger 34 and/or to the adapters 36.

This illustrates that heat exchangers 34, 34', 34" having different external dimensions, more precisely having different cross-sectional sizes and cross-sectional shapes and/or different lengths, can be fastened to the always identical housing 12 by using the associated different adapters 36, 36', 36".

FIG. 4 shows a top view of the upstream connection opening 40 of the housing 12 of the exhaust heat recovery device 14 with the adapter 36, which has a rectangular cross-section.

In general, both the geometries of the heat exchangers 34, more precisely the cross-sectional geometries of the heat exchangers 34, and the geometries of the adapters 36 are freely selectable.

Although various embodiments have been disclosed, a worker of ordinary skill in this art would recognize that certain modifications would come within the scope of this disclosure. For that reason, the following claims should be studied to determine the true scope and content of this disclosure.

The invention claimed is:

1. A modular system for exhaust heat recovery devices, comprising:
   heat exchangers which differ from each other by different external dimensions, and wherein the heat exchangers have connection ends;
   identically configured exhaust gas carrying housings, into each of which one of the heat exchangers can be introduced, each exhaust gas carrying housing having an upstream connection opening and a downstream connection opening, and the associated heat exchanger being fluidically seated between the upstream and downstream connection openings; and various tubular adapters which are adapted to the external dimensions of the heat exchangers and by which the associated heat exchanger is fastened at the connection ends to the exhaust gas carrying housing, the tubular adapters surrounding the upstream and downstream connection openings.

2. The modular system according to claim 1, wherein the heat exchangers have a respective shoulder at the connection ends which are opposite from each other, the shoulders constituting a receiving area for the tubular adapters and being stepped in relation to the rest of the respective heat exchanger by a jump in cross-section.

3. The modular system according to claim 1, wherein the tubular adapters receive the respective heat exchanger at a distance from the associated upstream or downstream connection opening and bridge a distance between the heat exchanger and the upstream or downstream connection opening.

4. The modular system according to claim 1, wherein the tubular adapters are each formed as a tube with a bent flange, the respective bent flange surrounding the associated upstream or downstream connection opening.

5. The modular system according to claim 4, wherein the tubular adapters each have an indentation protruding inwards, which forms an axial stop for the associated heat exchanger.

6. The modular system according to claim 1, wherein the tubular adapters are non-releasably connected with the respective heat exchanger.

7. The modular system according to claim 1, wherein each heat exchanger is surrounded by a protective housing which protects the respective heat exchanger from outside influences.

8. The modular system according to claim 7, wherein the protective housing is identical for all exhaust heat recovery devices.

9. The modular system according to claim 1, wherein the upstream and downstream connection openings and the heat exchangers have a rectangular cross-section.

10. The modular system according to claim 1, wherein the different external dimensions of the heat exchangers comprise different cross-sections.

11. A tubular adapter for a modular system for exhaust heat recovery devices, the modular system comprising, heat exchangers which differ from each other by different external dimensions and which have connection ends, identically configured exhaust gas carrying housings, into each of which one of the heat exchangers can be introduced, each exhaust gas carrying housing having an upstream connection opening and a downstream connection opening, and the associated heat exchanger being fluidically seated between the upstream and downstream connection openings, and the tubular adapter for a modular system comprising:

various tubular adapters which are adapted to the external dimensions of the heat exchangers and by which the associated heat exchanger is fastened at the connection ends to the exhaust gas carrying housing, the tubular adapters surrounding the upstream and downstream connection openings, and wherein the tubular adapter includes a laterally projecting encircling flange and has a through opening through which exhaust gas can flow.

12. The tubular adaptor for the modular system according to claim 11, wherein the different external dimensions of the heat exchangers comprise different cross-sections.

* * * * *